(12) United States Patent
Li

(10) Patent No.: US 9,507,206 B2
(45) Date of Patent: Nov. 29, 2016

(54) QUANTUM DOT COLOR FILTER AND MANUFACTURING METHOD THEREOF, AND DISPLAY APPARATUS

(71) Applicant: BOE TECHNOLOGY GROUP CO., LTD., Beijing (CN)

(72) Inventor: Lin Li, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 14/373,823

(22) PCT Filed: Jul. 24, 2013

(86) PCT No.: PCT/CN2013/080039
§ 371 (c)(1),
(2) Date: Jul. 22, 2014

(87) PCT Pub. No.: WO2014/190604
PCT Pub. Date: Dec. 4, 2014

(65) Prior Publication Data
US 2015/0301408 A1  Oct. 22, 2015

(30) Foreign Application Priority Data
May 28, 2013 (CN) .......................... 2013 1 0204242

(51) Int. Cl.
*F21V 9/16* (2006.01)
*G02F 1/1335* (2006.01)
(Continued)

(52) U.S. Cl.
CPC ......... *G02F 1/133617* (2013.01); *G02B 5/003* (2013.01); *G02B 5/201* (2013.01);
(Continued)

(58) Field of Classification Search
CPC .................................. H01J 1/62; H01J 63/04
See application file for complete search history.

(56) References Cited

U.S. PATENT DOCUMENTS

| | | | |
|---|---|---|---|
| 8,182,303 B2 * | 5/2012 | Ray | G09G 3/30 313/500 |
| 2005/0146258 A1 | 7/2005 | Weiss et al. | |

(Continued)

FOREIGN PATENT DOCUMENTS

| | | |
|---|---|---|
| CN | 102356348 A | 2/2012 |
| CN | 102629075 A | 8/2012 |

(Continued)

OTHER PUBLICATIONS

International Search Report, International Preliminary Report on Patentability and Written Opinion of the International Searching Authority of PCT/PCT/CN2013/080039 in Chinese, mailed Mar. 13, 2014.

(Continued)

*Primary Examiner* — Evan Dzierzynski
(74) *Attorney, Agent, or Firm* — Collard & Roe, P.C.

(57) ABSTRACT

A quantum dot color filter, comprising: a base substrate (11); a pixel layer (14) provided on the base substrate (11), comprising a plurality of pixels, wherein each of the pixels comprises a plurality of color sub-pixels (14R, 14G, 14B) of different colors, and at least one of the color sub-pixels (14R, 14G, 14B) is formed of a quantum dot material, and a color of light generated by the quantum dot material after the quantum dot material is excited by incident light (80) is the same as a color of the color sub-pixel (14R, 14G 14B) corresponding to the quantum dot material; an optical filtering layer (12) provided on the base substrate (11), which is disposed to correspond to the color sub-pixel formed of the quantum dot material, and configured to absorb the incident light (80) that fails to excite the quantum dot material but is transmitted through the color sub-pixel (14R, 14G, 14B). The quantum dot color filter has increased transmittance, and improved and enriched brightness and color of a picture. A manufacturing method concerning the quantum dot color filter and a display apparatus are further provided.

19 Claims, 3 Drawing Sheets

(51) Int. Cl.
*G02B 5/20* (2006.01)
*G02B 5/00* (2006.01)
*B82Y 20/00* (2011.01)

(52) U.S. Cl.
CPC ....... *G02B 5/208* (2013.01); *G02F 1/133514* (2013.01); *G02F 1/133621* (2013.01); *B82Y 20/00* (2013.01); *G02F 2001/133614* (2013.01); *G02F 2001/133624* (2013.01); *G02F 2202/108* (2013.01); *G02F 2202/36* (2013.01); *Y10S 977/774* (2013.01); *Y10S 977/834* (2013.01)

(56) References Cited

U.S. PATENT DOCUMENTS

| | | | |
|---|---|---|---|
| 2007/0007881 A1* | 1/2007 | Kim | B82Y 10/00 313/501 |
| 2009/0091689 A1 | 4/2009 | Rho et al. | |
| 2010/0123867 A1* | 5/2010 | Jung | G02F 1/133753 349/141 |
| 2011/0281388 A1 | 11/2011 | Gough et al. | |
| 2012/0019740 A1 | 1/2012 | Kadowaki et al. | |
| 2012/0206677 A1* | 8/2012 | Chung | G02F 1/133516 349/97 |
| 2012/0206678 A1* | 8/2012 | Kim | G02F 1/133516 349/106 |
| 2012/0287117 A1* | 11/2012 | Weber | G02B 27/2264 345/419 |
| 2013/0010229 A1 | 1/2013 | Shin et al. | |
| 2013/0027441 A1* | 1/2013 | Kabe | G09G 3/3413 345/690 |
| 2014/0132890 A1 | 5/2014 | Zhang | |

FOREIGN PATENT DOCUMENTS

| | | |
|---|---|---|
| CN | 102866535 A | 1/2013 |
| CN | 102944943 A | 2/2013 |
| CN | 103091895 A | 5/2013 |
| CN | 103226260 A | 7/2013 |
| JP | 2009251129 A | 10/2009 |

OTHER PUBLICATIONS

Chinese Office Action of Chinese Application No. 201310204242.8, mailed Dec. 29, 2014 with English translation.
English Translation of the International Search Report of PCT/CN2013/080039, mailed Mar. 13, 2014.
Second Chinese Office Action of Chinese Application No. 201310204242.8, mailed Apr. 23, 2015 with English translation.
English translation of the International Preliminary Report on Patentability and Written Opinion of the International Searching Authority of PCT/CN2013/080039, issued Dec. 1, 2015.
Third Chinese Office Action of Chinese Application No. 201310204242.8, mailed Sep. 14, 2015 with English translation.
Fourth Chinese Office Action of Chinese Application No. 201310204242.8, mailed Feb. 2, 2016 with English translation.
Fifth Chinese Office Action in Chinese Application No. 201310204242.8, mailed Jun. 20, 2016 with English translation.

* cited by examiner

QUANTUM DOT COLOR FILTER AND MANUFACTURING METHOD THEREOF, AND DISPLAY APPARATUS

CROSS REFERENCE TO RELATED APPLICATIONS

This application is the National Stage of PCT/CN2013/080039 filed on Jul. 24, 2013, which claims priority under 35 U.S.C. §119 of Chinese Application No. 201310204242.8 filed on May 28, 2013, the disclosure of which is incorporated by reference.

TECHNICAL FIELD

Embodiments of the present invention relate to a quantum dot color filter and a manufacturing method thereof, and a display apparatus comprising the quantum dot color filter.

BACKGROUND

With the development of science and technology, liquid crystal display technology also continues to advance correspondingly. TFT-LCDs (Thin Film Transistor-Liquid Crystal Displays) act as an important role in the field of display by virtue of the advantages of good image display quality, low energy consumption, environmental protection and so on, but it is difficult for the displayed color to cover full gamut. A display technology based on organic light emitting diodes (OLEDs) that has been booming in recent years also matures increasingly. An OLED display has a simple construction, thin thickness, and fast response speed, and more rich colors can be achieved with it. Furthermore, with the appearance of quantum dots, quantum dot displays also emerge accordingly. In view of the fact that Quantum Dots emit light in a very narrow wavelength range and present a very pure color, and can be used to realize the fine adjustment. With a new quantum dot display panel, the brightness and the vividness of picture are greatly improved, and besides, the energy consumption is reduced, as compared with a current display panel.

Quantum dots are some semiconductor nanocrystals that cannot be seen by naked eyes and are extremely tiny, which can be formed by combination of zinc, cadmium, selenium and sulfur atoms, and the grain diameter of the nanocrystals is less than 10 nanometers. Quantum dots have distinctive characteristics: they can emit light when subjected to an electrical or optical stimulation so as to produce bright light and present a pure color, and the color of the emitted light is determined by the composition material and the size of quantum dots. The smaller the size is, the closer to blue light it is, and the greater the size is, the closer to red light it is. Given that the computation is accurate, quantum dots can emit bright red, green and blue light, which can serve as light sources in three primary colors of RGB for a display.

For a conventional LCD display, the color purity of a color filter needs to be improved if the color gamut needs to be expanded, but this will degrade the transmittance of the color filter. In reply to this degrade, it is necessary to enhance the brightness of a backlight source, but this increases the power consumption of the LCD. In an existing example that quantum dots are applied to a backlight source of a liquid crystal display, the color purity can be improved without increasing color concentration of a color filter, and the power consumption will not be raised much, either. Therefore, the application of quantum dots to displays has gradually become a trend.

SUMMARY

According to embodiments of the present invention, there are provided a quantum dot color filter and a manufacturing method thereof, and a display apparatus, so as to overcome the drawbacks of an existing color filter that its gamut is limited and affects the display quality of final products, the production cost is relatively high, and so on.

In one aspect of the invention, there is provided a quantum dot color filter, comprising: a base substrate; a pixel layer provided on the base substrate that comprises a plurality of pixels, wherein each of the pixels comprises a plurality of color sub-pixels of different colors, and at least one color sub-pixel is formed of a quantum dot material, and a color of light generated by the quantum dot material after the quantum dot material is excited by incident light is the same as a color which the corresponding color sub-pixel is intended to present; and an optical filtering layer provided on the base substrate, which is disposed to correspond to the color sub-pixel formed of the quantum dot material, and configured to absorb the incident light that fails to excite the quantum dot material but is transmitted through the color sub-pixel.

For example, a thickness of the optical filtering layer may be in the range of 0.2 μm to 0.7 μm.

For example, a material for the optical filtering layer may be an ultraviolet absorbent or a yellow photosensitive resin composition.

For example, the pixel may comprise a red sub-pixel formed of a red quantum dot material, a green sub-pixel formed of a green quantum dot material and a blue sub-pixel formed of a blue quantum dot material or a transparent material. For example, the color filters may further comprise a yellow sub-pixel, and the yellow sub-pixel is formed of a yellow quantum dot material.

For example, the color filter may further comprise a black matrix, which is configured to separate color sub-pixels with different colors.

For example, the color filters may further comprise a protection layer, which covers the pixels and the black matrix and is of a transparent material.

For example, the quantum dot material may be at least one of zinc sulfide, zinc oxide, gallium nitride, zinc selenide, cadmium sulfide, gallium selenide, cadmium selenide, zinc telluride, cadmium telluride, gallium arsenide, indium phosphide or lead telluride.

In another aspect of the invention, there is further provided a display apparatus, comprising the above quantum dot color filter and a backlight source, wherein a wavelength of light emitted by the backlight source is smaller than a wavelength of light generated by the quantum dot material in the color filter after the quantum dot material is excited.

For example, the backlight source may be a blue backlight source; the red sub-pixel in the quantum dot color filter is formed of a red quantum dot material, the green sub-pixel is formed of a green quantum dot material, the blue sub-pixel is formed of a transparent material, the region of the blue sub-pixel has no optical filtering layer provided therein, and the region of every other one of the color sub-pixels has an optical filtering layer provided therein that is used to absorb blue light.

For example, the backlight source may be a blue light emitting diode, the wavelength range of emitted light is from 440 to 455 nm; and the light absorption layer acts to absorb light in the range of 440 to 455 nm.

For example, the backlight source may be an ultraviolet backlight source; the red sub-pixel in the color filter is formed of a red quantum dot material, the green sub-pixel is formed of a green quantum dot material, the blue sub-pixel is formed of a blue quantum dot material, the region of each of the color sub-pixels has an optical filtering layer provided therein that is used to absorb an ultraviolet light.

In still another aspect of the invention, there is further provided a manufacturing method of a quantum dot color filter, the color filter comprising a plurality of pixels, each of which consists of a plurality of color sub-pixels of different colors, the method comprising: forming a pattern of an optical filtering layer; forming a pattern of the color sub-pixels, wherein the color sub-pixels are formed in color sub-pixel regions for different colors with quantum dot materials of corresponding colors.

For example, the method may further comprise: forming a black matrix; and/or forming a protection layer.

For example, the method may further comprise: forming a pattern of an optical filtering layer, wherein the optical filtering layer is not provided in a blue sub-pixel region of the color filter; forming a black matrix, with which, different color sub-pixel regions are separated; forming a red sub-pixel in a red sub-pixel region of the color filter with a red quantum dot material, forming a green sub-pixel in a green sub-pixel region of the color filter with a green quantum dot material, and forming a blue sub-pixel in a blue sub-pixel region of the color filter with a transparent material.

For example, the method may further comprise: forming a pattern of an optical filtering layer, wherein the optical filtering layer is provided in each of the color sub-pixel regions; forming a black matrix, with which different color sub-pixel regions are separated; forming a red sub-pixel in a red sub-pixel region of the color filter with a red quantum dot material, forming a green sub-pixel in a green sub-pixel region of the color filter with a green quantum dot material, and forming a blue sub-pixel in a blue sub-pixel region of the color filter with a blue quantum dot material.

For example, transparent material for the blue sub-pixel region may be formed at the same time as the protection layer.

For example, the pixels may further comprise a yellow sub-pixel, which is formed by a yellow quantum dot material.

BRIEF DESCRIPTION OF THE DRAWINGS

In order to illustrate the technical solution of the embodiments of the invention more clearly, the drawings of the embodiments will be briefly described below; it is obvious that the drawings as described below are only related to some embodiments of the invention, but not limitative of the invention.

REFERENCE NUMERALS

11: base substrate; 12: optical filtering layer; 13: black matrix; 14: pixel layer; 14R: red sub-pixel; 14G: green sub-pixel; 14B: blue sub-pixel; 14Y: yellow sub-pixel; 15: protection layer; 10: color filter; 20: array substrate; 30: liquid crystal layer; 40: backlight source; 50: blue light; 60: RGB light; 70: luminous panel; 80: ultraviolet light.

DETAILED DESCRIPTION

In order to make objects, technical details and advantages of the embodiments of the invention apparent, hereinafter, the technical solutions of the embodiments of the invention will be described in a clearly and fully understandable way in connection with the drawings related to the embodiments of the invention. It is obvious that the described embodiments are just a part but not all of the embodiments of the invention. Based on the described embodiments of the invention, those ordinarily skilled in the art can obtain other embodiment(s), without any inventive work, which come(s) within the scope sought for protection by the invention.

Embodiment 1

Figure 1:
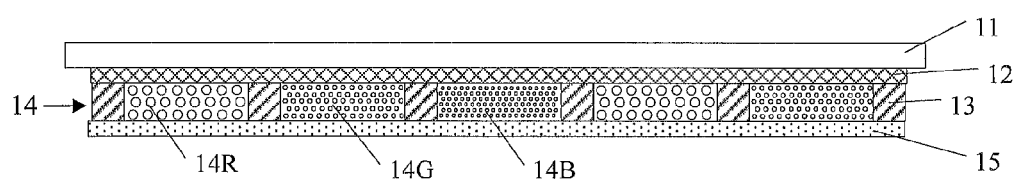
FIG. 1 is a structurally schematic view illustrating a quantum dot color filter provided by embodiment 1 of the invention.

As illustrated in FIG. 1, according to the embodiment, there is provided a color filter, which comprises a base substrate 11 and a pixel layer 14, and the pixel layer 4 is provided on the base substrate 11 and comprises a plurality of pixels, each of which comprises a plurality of color sub-pixels of different colors. These color sub-pixels of different colors are for example red, green and blue (RGB) sub-pixels 14R, 14G and 14B. The color filter further comprises an optical filtering layer 12 provided on the base substrate 11. The base substrate 11 may be a glass substrate or of quartz, resin or any other transparent material. At least one color sub-pixel in each pixel is formed of a quantum dot material, and the color of the light generated by the quantum dot material after it is excited by incident light is the same as the color which the corresponding color sub-pixel is intended to present. The optical filtering layer 12 is disposed to correspond to the region of the color sub-pixel formed of the quantum dot material, and configured to absorb the incident light that fails to excite the quantum dot material but is transmitted through the color sub-pixel. As illustrated in FIG. 1, the optical filtering layer 12 is disposed between the base substrate 11 and color sub-pixels of the pixel layer 14. For example, the incident light for exciting comes from a preset light source, such as a backlight source of a display apparatus.

The optical filtering layer 12 and the pixel layer 14 may be disposed on different sides of the base substrate 11, as long as the light emitted from the pixel layer 14 passes through the optical filtering layer 14 again. For example, the pixel layer 14 may be formed directly on the base substrate 11.

In the embodiment, color sub-pixels in one pixel may comprise a red sub-pixel 14R, a green sub-pixel 14G and a blue sub-pixel 14B. The red sub-pixel 14R is formed of a red quantum dot material; the green sub-pixel 14G is formed of a green quantum dot material; and the blue sub-pixel 14B is formed of a blue quantum dot material.

Quantum dots are some semiconductor nanocrystals that cannot be seen by naked eyes and are extremely tiny, which can be formed by combination of zinc, cadmium, selenium and sulfur atoms, and the grain diameter of the crystals is for example less than 10 nanometers. Quantum dots have distinctive characteristics: they will emit light when subjected to an electrical or optical stimulation so as to produce a bright light and present a pure color, and the color of the emitted light is determined by the composition material and the size of quantum dots. The quantum dots in the embodiment may be at least one of zinc sulfide, zinc oxide, gallium nitride, zinc selenide, cadmium sulfide, gallium selenide, cadmium selenide, zinc telluride, cadmium telluride, gallium arsenide, indium phosphide and lead telluride. Certainly, the material for the quantum dots comprises but is not limited to the several species listed above, other substances having the same or similar properties as the above substances may also be applicable. With a zinc sulfide (ZnS) quantum dot as an example, the size of a red emitting quantum dot is mainly in the range of about 9 to 10 nm, the size of a yellow emitting quantum dot is about 8 nm, and size of a green emitting quantum dot is about 7 nm. For another example, cadmium selenide (CdSe) emits blue fluorescence when its grain diameter is 2.1 nm, and emits green fluorescence when its grain diameter is 5 nm, and when its grain diameter is close to 10 nm, the excited fluorescence is near red.

For example, in order to prevent the light color of a backlight source from appearing through the red sub-pixel, the green sub-pixel and the blue sub-pixel, an optical filtering layer capable of absorbing the backlight may be provided on the base substrate such as a glass substrate. The light rays of the incident light coming from such as a backlight source go through a color sub-pixel formed of a quantum dot material firstly, the incident light coming from the backlight source excites the quantum dot material to emit light in a corresponding color, the light rays that pass through the color sub-pixel and fail to excite the quantum dot material are filtered upon going through the optical filtering layer, and the light in a corresponding color emitted by the quantum dot material can be transmitted through the optical filtering layer. The color filter is formed by utilizing such a physical characteristic of quantum dots that fluorescence in different colors can be rendered by the quantum dots under the irradiation of a backlight source, so that transmittance of the color filter is enhanced. The brightness and color of a displayed picture are greatly improved and enriched, the display quality of the displayed picture is effectively promoted, the experience of a user is boosted, and meanwhile, the production costs are reduced to the most degree.

In order that light of the backlight source can be better absorbed and meanwhile the thickness of the display panel is reduced to the most degree, the thickness of the optical filtering layer 12 may be set to be in the range of 0.2 μm to 0.7 μm. The material for the optical filtering layer 12 may be an ultraviolet absorbent. It is necessary to elect the ultraviolet absorbent according to the wavelength range of the emitted light of the backlight source, and the optical filtering layer formed by the ultraviolet absorbent can serve to effectively absorb ultraviolet light that passes through a color sub-pixel region but fails to excite the quantum dot material, and meanwhile can serve to allow passage of visible light (RGB visible light) emitted by the quantum dot material.

The ultraviolet absorbent may be salicylates, benzophenones, benzotriazoles, substituted acrylonitriles, triazines or hindered amines. For example, it may be phenyl salicylate, 2-(2'-hydroxyl-5'-methyl phenyl)benzotriazole, 2,4-dihydroxy benzophenone, 2-hydroxy-4-methoxy benzophenone, or the like.

The quantum dot color filter in the embodiment, with the optical filtering layer made of the ultraviolet absorbent be provided thereon, can serve to effectively absorb the light rays of the light from the backlight source that fails to excite the quantum dot material to emit light but is transmitted through a color sub-pixel, and meanwhile allow passage of the light corresponding to the color sub-pixel, which enhances the color saturation of the color sub-pixel, and in turn, improves the display quality.

In addition, the color filter may further comprise a black matrix 13 and a protection layer 15. The black matrix 13 acts to separate color sub-pixels 14R, 14G and 14B in different colors, so as to prevent leakage of background light, raise the display contrast, prevent the color mixing and increase color purity. The protection layer 15 covers the pixel layer 14 and the black matrix 13, and serves to protect color sub-pixels and the black matrix, and it is of a transparent material.

Figure 2:
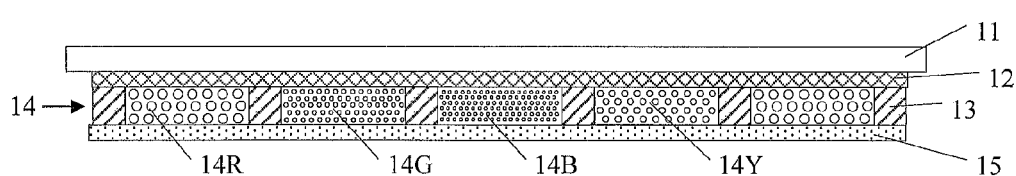
FIG. 2 is a structurally schematic view illustrating another quantum dot color filter provided by embodiment 1 of the invention.

Additionally, in order to further enrich the color saturation of the display effect e and make the color gamut wider, each of the pixels may further comprise a yellow sub-pixel 14Y, and the yellow sub-pixel 14Y is formed of a yellow quantum dot material. The region of the yellow sub-pixel also has an optical filtering layer 12 provided therein. Please refer to FIG. 2 for the example.

Embodiment 2

Figure 3:
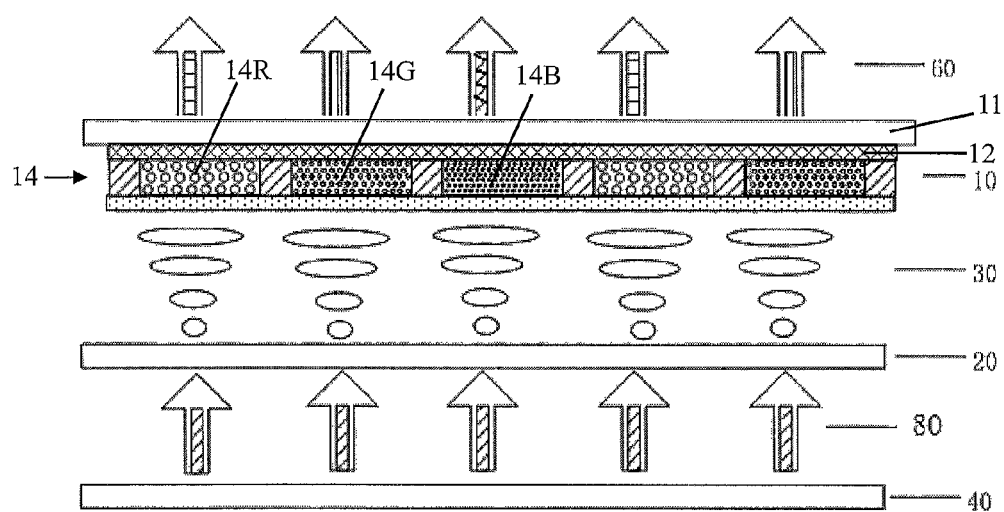
FIG. 3 is a structurally schematic view illustrating a display apparatus provided by embodiment 2 of the invention.

As illustrated in FIG. 3, in the embodiment, there is provided a display apparatus, comprising the color filter 10 in Embodiment 1, an array substrate 20 and a backlight source 40. A liquid crystal layer 30 is provided between the color filter 10 and the array substrate 20 so as to form a liquid crystal panel. The backlight source 40 is an ultraviolet backlight source for emitting ultraviolet light 80, and is such as a direct-light type backlight source. In the color filter 10, the red sub-pixel 14R is formed of a red quantum dot material; the green sub-pixel 14G is formed of a green quantum dot material; and the blue sub-pixel 14B is formed of a blue quantum dot material. The region of each color sub-pixel has an optical filtering layer 12 provided therein, which acts to absorb an ultraviolet light 80 that fails to excite the quantum dot material but is transmitted through the color sub-pixel. As illustrated in FIG. 3, the pixel layer 14 of the color filter 10 is closer to the backlight source 40 than the optical filtering layer 12. The optical filtering layer 12 may be located on an inner side of the base substrate 11, and may also be located on its outer side.

It is to be noted that, ultraviolet light 80 emitted by the ultraviolet backlight source 40 in the embodiment go through color sub-pixels 14R, 14G and 14B formed of quantum dot materials firstly, ultraviolet light 80 excite the quantum dot materials to emit light in corresponding colors, while ultraviolet light 80 that fails to excite the quantum dot materials but is transmitted through the color sub-pixels is filtered out upon going through the optical filtering layer 12, but the light in corresponding colors (i.e., red light, green light and blue light) emitted by the quantum dot materials can be transmitted through the optical filtering layer 12.

Ultraviolet light 80 emitted by the ultraviolet backlight source 40 are transformed into outgoing light 60 in red, green and blue for display upon passing through the red sub-pixel 14R, the green sub-pixel 14G and the blue sub-pixel 14B formed of quantum dot materials, while ultraviolet light 80 that fails to excite the quantum dot materials but is transmitted through these color sub-pixels is absorbed by the optical filtering layer 12. Thereby, color light transmission of the quantum dot color filter 10 is achieved.

The display apparatus may be a liquid crystal display, an organic light emitting diode (OLED), a liquid crystal panel, a liquid crystal computer or other display apparatus. With the color filter in embodiments, the display apparatus greatly improves and enriches the brightness and color of a displayed picture, effectively promotes the display quality of the displayed picture, and boosts the experience of a user.

Embodiment 3

Figure 4:
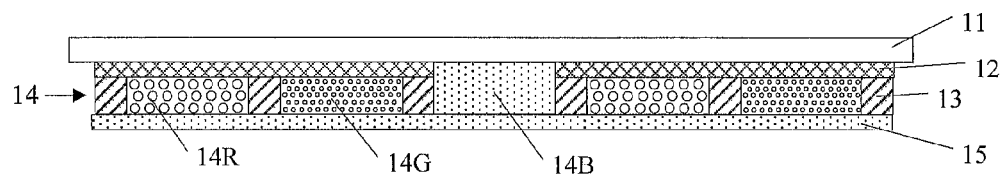
FIG. 4 is a structurally schematic view illustrating a quantum dot color filter provided by embodiment 3 of the invention.

As illustrated in FIG. 4, according to the embodiment, there is provided a color filter, comprising a base substrate 11 and a pixel layer 14 disposed on the base substrate 11, and the pixel layer 14 comprises a plurality of pixels, each of which comprises a plurality of color sub-pixels in different colors. These color sub-pixels in different colors are for example red, green and blue sub-pixels. The color filter further comprises an optical filtering layer 12 disposed on the base substrate 11. The base substrate 11 may be a glass substrate, or of quartz, resin or any other transparent material. At least one color sub-pixel in each pixel is formed of a quantum dot material, and the color of the light generated by the quantum dot material after it is excited by an incident light is the same as the color which the corresponding color sub-pixel is intended to present. The optical filtering layer 12 is disposed to correspond to a color sub-pixel region formed of the quantum dot material, and acts to absorb the light that fails to excite the quantum dot material but is transmitted through the color sub-pixel. As illustrated in FIG. 4, the optical filtering layer 12 is disposed between the base substrate 11 and the color sub-pixels. For example, the incident light for exciting comes from a preset light source, such as a backlight source of a display apparatus.

The optical filtering layer 12 and the pixel layer 14 may be disposed on different sides of the base substrate 11, as long as a light exiting from the pixel layer 14 passes through the optical filtering layer 14 again. For example, the pixel layer 14 may be formed directly on the base substrate 11.

In the embodiment, a pixel comprises a red sub-pixel 14R, a green sub-pixel 14G and a blue sub-pixel 14B. The red sub-pixel 14R is formed of a red quantum dot material; the green sub-pixel 14G is formed of a green quantum dot material; and the blue sub-pixel 14B is formed of a blue quantum dot material.

In the embodiment, the quantum dots may be at least one of zinc sulfide, zinc oxide, gallium nitride, zinc selenide, cadmium sulfide, gallium selenide, cadmium selenide, zinc telluride, cadmium telluride, gallium arsenide, indium phosphide and lead telluride. Certainly, the material for the quantum dots comprises but is not limited to the substances listed above, other substances having the same or similar properties as the above-mentioned substances may also be applicable. With a zinc sulfide (ZnS) quantum dot as an example, the size of a red emitting quantum dot is mainly in the range of about 9 to 10 nm, the size of a yellow emitting quantum dot is about 8 nm, and the size of a green emitting quantum dot is about 7 nm.

For example, in order to prevent the color of the light emitted from the backlight source from appearing through the red sub-pixel and the green sub-pixel, the optical filtering layer 12 capable of absorbing the backlight is provided on the base substrate such as a glass substrate. The wavelength of the light emitted by the backlight source may be smaller than the wavelength of the light generated by the quantum dot material in the color filter after the quantum dot material is excited. For example, the thickness of the optical filtering layer is in the range of 0.2 μm to 0.7 μm. The material for the optical filtering layer 12 is such as a yellow photosensitive resin composition, which may comprise alkali-soluble resin, polymerizable monomer, initiator, yellow pigment, solvent and so on. For example, it may consist of an alkali-soluble resin, a polymerizable monomer, an initiator, a yellow pigment, a dispersant, an additive and a solvent.

For example, the alkali-soluble resin may be an alkali-soluble resin in the series of methacrylates, such as, an alkali-soluble resin made of methyl methacrylate, n-butyl methacrylate, methacrylic acid, methyl acrylate, butyl acrylate, ethyl acrylate, hydroxyethyl acrylate, ethylene glycol diacrylate, diglycol diacrylate, ethylene glycol dimethacrylate, or the like, and may have the molecular weight in the range of about 4000 to 20000.

For example, the polymerizable monomer may be a polyfunctinal monomer with two or more polymerizable, unsaturated double bonds, such as, dipentaerythritol hexaacrylate, dipropylene glycol diacrylate, tripropylene glycol diacrylate, trimethylol propane triacrylate, di(trimethylol propane)tetraacrylate, or the like.

For example, the photo-initiator may be a radical photo-initiator, or a cationic photo-initiator, or combination of a radical photo-initiator and a cationic photo-initiator, such as, 1-hydroxy-cyclohexyl phenyl ketone, 2-Hydroxy-2-methylpropiophenone, 2-methyl-1-[4-(methylthio)phenyl]-2-morpholino-1-propanone, (2,4,6-trimethylbenzoyl) diethyl phosphate, diphenyl(2,4,6-trimethylbenzoyl)phosphine oxide, or the like.

For example, the yellow pigment may be of an azo type, an azo condensation type, and a heterocyclic type, such as, P.Y.1, P.Y.12, P.Y.3, P.Y.13, P.Y.83, P.Y.93, P.Y.94, P.Y.95, P.Y.109, P.Y.126, P.Y.127, P.Y.138, P.Y.139, P.Y.139, P.Y.147, P.Y.150, P.Y.174, P.Y.180, etc.

For example, the solvent may be one or a combination of two or more selected from the group consisting of methyl ethyleneglycol monomethylether, ethyleneglycol monoethylether, ethyleneglycol monopropylether, ethyleneglycol monobutylether, diethyleneglycol diethylether, ethyl acetate, methyl ethyl ketone, methyl isobutyl ketone, ethylene glycol monomethyl ether, propylene glycol monomethyl ether, propylene glycol monomethyl ether acetate, cyclohexane, xylene and isopropanol.

For example, the dispersant may be BYK, solsperse, EFKA, ajinomoto or other well-known pigment wetting dispersant.

For example, the assistants may be an adhesion promoter, antioxidant, anti coagulant, leveling agent, defoaming agent, etc., and are added as desired.

For example, in the photosensitive resin composition, the weight content of an alkali-soluble resin assumes 10 to 30%, the weight content of a polymerizable monomer (or a light-cured resin) assumes 10 to 30%, the weight content of a photo initiator assumes 1 to 20%, and a pigment assumes 10 to 40%.

The quantum dot color filter in the embodiment, with the optical filtering layer made of a yellow photosensitive resin composition, can serve to effectively absorb the light rays of the light emitted from the backlight source that fails to excite the quantum dot material to emit light, but can allow passage of the light corresponding to the color sub-pixel. This enhances the color saturation of the color sub-pixel, and in turn, improves the display quality.

In addition, the color filter may further comprise a black matrix 13 and a protection layer 15. The black matrix 13 acts to separate color sub-pixels in different colors, so as to prevent leakage of a background light, raise the display contrast, prevent the color mixing and increase color purity. The protection layer 15 covers the pixel layer 14 and the black matrix 13, and serves to protect color sub-pixels and the black matrix, and it is a transparent material.

Additionally, in order to further enrich color saturation of the display effect and make the color gamut wider, each of the pixels may further comprise a yellow sub-pixel 14Y, and the yellow sub-pixel 14Y is formed of a yellow quantum dot material. The region of the yellow sub-pixel also has an optical filtering layer 12 provided therein.

Embodiment 4

Figure 5:
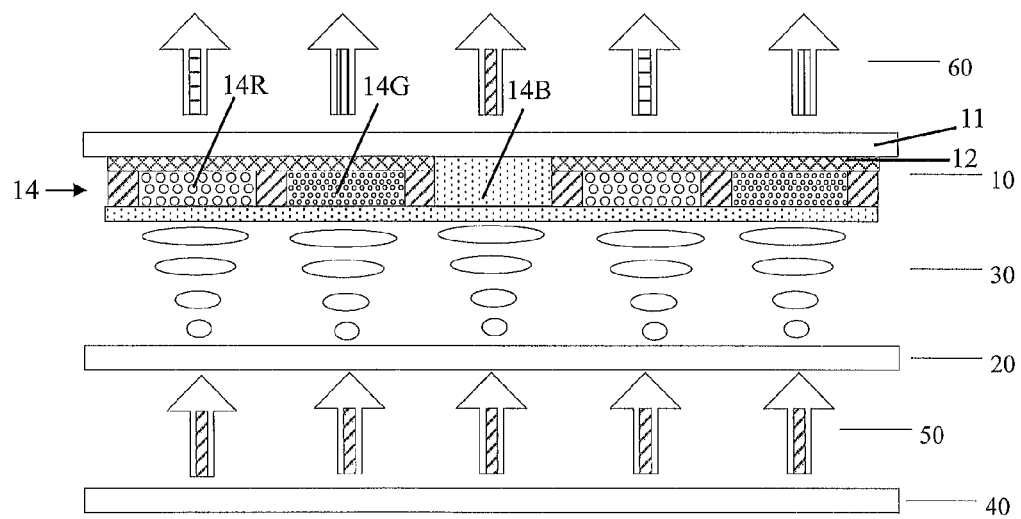
FIG. 5 is a structurally schematic view illustrating a display apparatus provided by embodiment 4 of the invention.

As illustrated in FIG. 5, in the embodiment, there is provided a display apparatus, comprising the color filter 10 in Embodiment 3, an array substrate 20 and a backlight source 40. The wavelength of blue light 50 rays emitted by the backlight source 40 is smaller than the wavelength of rays generated by a quantum dot material in a sub-pixel in the color filter 10 after it is excited. The backlight source 40 is such as a direct-light type backlight source.

The backlight source 40 in the embodiment is a blue backlight source, is such as a blue light emitting diode, and the wavelength range of blue light 50 emitted by it is from 440 to 455 nm; and the optical filtering layer 12 absorbs rays in the range of 440 to 455 nm. It is to be noted that the blue light 50 emitted by the blue backlight source 40 in the embodiment go through color sub-pixels firstly, and then go through the optical filtering layer 12, by which the background light that is transmitted through the color sub-pixels but fails to excite quantum dot materials is filtered out.

Each of pixels may comprise a red sub-pixel 14R, a green sub-pixel 14G and a blue sub-pixel 14B. The red sub-pixel 14R is formed of a red quantum dot material; the green sub-pixel 14G is formed of a green quantum dot material; and the blue sub-pixel 14B is formed of a transparent material. The blue sub-pixel region 14B has no optical filtering layer 12 provided therein, and the rest color sub-pixel regions have the optical filtering layer 12 provided therein for absorbing the blue light 50.

The material for the optical filtering layer 12 is such as a yellow photosensitive resin composition, for example consisting of an alkali-soluble resin, a polymerizable monomer, an initiator, a yellow pigment, a dispersant, an additive and a solvent.

The optical filtering layer 12 in the embodiment acts to absorb rays in the range of 440 to 455 nm, and allow passage of the color light in the range of 490 to 760 nm. The center wavelength of red light is 630 nm, and therefore, after red and blue light pass through the yellow filtering layer, the red-light part can be transmitted through and the blue-light part is absorbed by the optical filtering layer 12; while the center wavelength of green light is 550 nm, and therefore, after green and blue light pass through the yellow filtering layer, the green-light part still can be transmitted through, and the blue-light part is absorbed by the yellow filtering layer.

After the light emitted by the blue backlight source 40 passes through the color filter 10, corresponding to a red sub-pixel, a green sub-pixel and a blue sub-pixel, the outgoing light 60 in red, green and blue are emitted, respectively. In this way, the color light transmission of the quantum dot color filter is achieved thereby.

As the backlight source 40 is a blue backlight source, the blue backlight source can be made of a transparent material.

Figure 6:
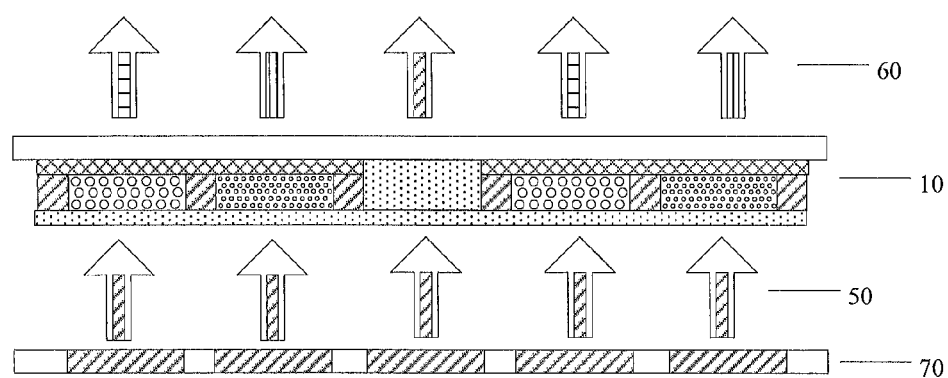
FIG. 6 is a structurally schematic view illustrating another display apparatus provided by embodiment 4 of the invention.

Referring to FIG. 6, the color filter in the embodiment can also be applied to an organic light emitting diode (OLED), and the backlight source 40 is replaced by the light-emitting panel (e.g. an OLED panel for emitting blue light) 70.

Embodiment 5

Figure 7:
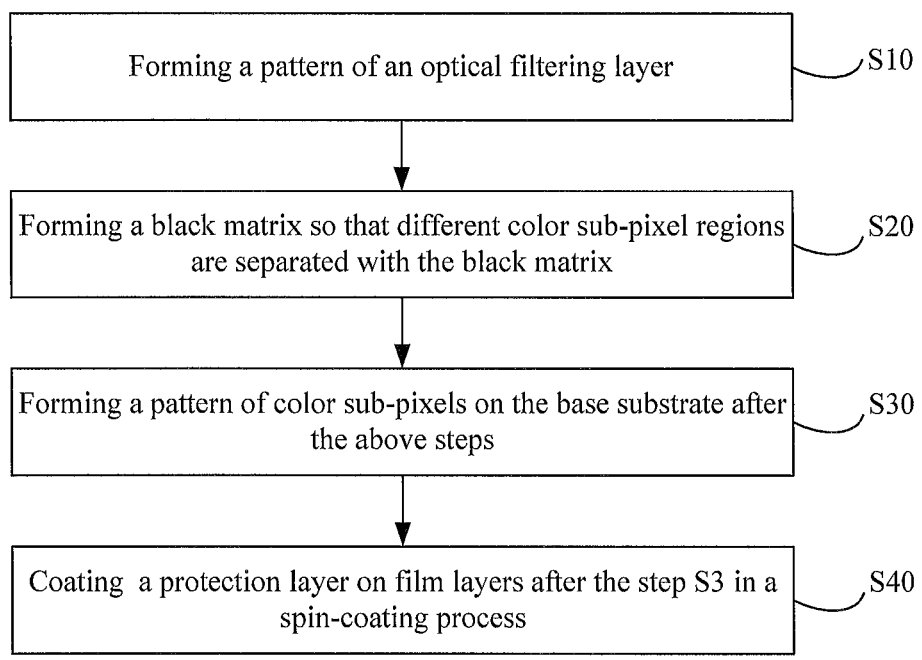
FIG. 7 is a flow chart illustrating a manufacturing method of a quantum dot color filter provided by embodiment 5 of the invention.

As illustrated in FIG. 7, according to an embodiment of the invention, there is provided a process for manufacturing the structure of the color filter in Embodiment 1, comprising a plurality of pixels, each of which consists of a plurality of color sub-pixels in different colors, and the process comprises the following steps.

Step S10, the pattern of an optical filtering layer is formed.

For example, a filtering layer thin film is formed on a base substrate, and is subjected to a patterning process so as to form the pattern of the optical filtering layer.

In an example, a filtering layer thin film is formed on a base substrate by means of coating, sputtering, deposition or other way, and after exposure is conducted on the above substrate with a mask, it is formed into the pattern of the optical filtering layer through development and other process. The thickness of the thin film may be in the range of 0.2 to 0.7 μm.

Step S20, a black matrix is formed, so that different color sub-pixel regions are separated with the black matrix.

For example, a black photoresist is spin-coated or blade-coated, and is formed into a black matrix pattern for defining pixel regions by exposing, developing, and baking.

Step S30, a pattern of color sub-pixels is formed on the base substrate after the above steps.

For example, a red sub-pixel is formed in a red sub-pixel region of the color filter with a red quantum dot material, a green sub-pixel is formed in a green sub-pixel region of the color filter with a green quantum dot material, and a blue sub-pixel is formed in a blue sub-pixel region of the color filter with a blue quantum dot material.

For example, by way of transferring or printing, a quantum dot material for a red color, a quantum dot material for a green color and a quantum dot material for a blue color are transferred to the related regions defined by the black matrix.

Step S40, a protection layer is coated on film layers after the step S3 in a spin-coating process.

Embodiments of the invention will not set a limit upon the process sequence of steps. For example, it is possible that a black matrix is formed firstly, by which different color sub-pixel regions are separated; then the pattern of an optical filtering layer is formed, the optical filtering layer being disposed to correspond to color sub-pixels formed of quantum dot materials; and next, the pattern of the color sub-pixels and a protection layer are formed.

Besides, when an optical filtering layer and a pixel layer are provided on different sides of a base substrate, it is possible that a black matrix is firstly formed, and then the pattern of sub-pixels and a protection layer are formed in sequence; and at last, the optical filtering layer is formed on the other side of the base substrate. Alternatively, an optical filtering layer is formed on one side of a base substrate, and afterwards, a black matrix, the pattern of sub-pixels, and a protection layer are formed on the other side of the base substrate in order.

It is to be noted that the color filter manufactured in the process in the embodiment, in practical applications, needs an ultraviolet backlight source in cooperation.

Embodiment 6

According to an embodiment of the invention, there is provided a process for manufacturing structure of the color filter in Embodiment 3, comprising a plurality of pixels, each of which consists of a plurality of color sub-pixels in different colors, and the method comprises the following steps.

Step S10', a pattern of an optical filtering layer is formed.

For example, a filtering layer thin film is formed on a base substrate, and is subjected to a patterning process so as to form the pattern of the optical filtering layer.

In an example, a filtering layer thin film is formed on a base substrate by means of coating, sputtering, deposition or other way, and after exposure is conducted on the above substrate with a mask, it is formed into the pattern of the optical filtering layer through development and other process. The thickness of the thin film may be in the range of 0.2 to 0.7 μm.

Step S20', a black matrix is formed, so that different color sub-pixel regions are separated with the black matrix.

For example, a black photoresist is spin-coated or blade-coated, and is formed into a black matrix pattern for defining pixel regions through exposure and development followed by baking.

Step S30', the pattern of color sub-pixels is formed on the base substrate after the above steps.

For example, a red sub-pixel is formed in a red sub-pixel region of the color filter with a red quantum dot material, a green sub-pixel is formed in a green sub-pixel region of the color filter with a green quantum dot material, and a blue sub-pixel is formed in a blue sub-pixel region of the color filter with a blue quantum dot material.

For example, by way of transferring or printing, a quantum dot material for a red color, a quantum dot material for a green color, and a quantum dot material for a blue color are transferred to related regions defined by the black matrix.

In addition, when the blue sub-pixel is formed by a transparent material, a transparent protection layer can be accomplished with the same step as the transparent blue sub-pixel.

Embodiments of the invention will not set a limit upon the process sequence of steps, either, the specific contents are the same as Embodiment 5, and will not be described here one by one.

It is to be noted that the color filter manufactured in the process in the embodiment, in practical applications, needs an ultraviolet backlight source in cooperation.

Descriptions made above are merely exemplary embodiments of the invention, but are not used to limit the protection scope of the invention. The protection scope of the invention is determined by attached claims.

The invention claimed is:

1. A quantum dot color filter, comprising:
a base substrate;
a pixel layer provided on the base substrate, comprising a plurality of pixels, wherein each of the pixels comprises a blue sub-pixel and a plurality of color sub-pixels of different colors other than blue, and at least one color sub-pixel is formed of a quantum dot material, and a color of light generated by the quantum dot material after the quantum dot material is excited by incident light is the same as a color which the corresponding color sub-pixel is intended to present;
an optical filtering layer provided on the base substrate, which is disposed to correspond to the color sub-pixel formed of the quantum dot material, and configured to absorb the incident light that fails to excite the quantum dot material but is transmitted through the color sub-pixel,
wherein, the blue sub-pixel is directly disposed on the base substrate, and the optical filtering layer is disposed between the base substrate and the color sub-pixels other than the blue sub-pixel.

2. The quantum dot color filter claimed as claim 1, wherein a thickness of the optical filtering layer is in the range of 0.2 μm to 0.7 μm.

3. The quantum dot color filter claimed as claim 1, wherein a material for the optical filtering layer is an ultraviolet absorbent or a yellow photosensitive resin composition.

4. The quantum dot color filter claimed as claim 1, wherein the pixel comprises a red sub-pixel, a green sub-pixel and a blue sub-pixel, and
the red sub-pixel is formed of a red quantum dot material, the green sub-pixel formed of a green quantum dot material, and the blue sub-pixel formed of a blue quantum dot material or a transparent material.

5. The quantum dot color filter claimed as claim 4, wherein the pixel further comprises a yellow sub-pixel, and the yellow sub-pixel is formed of a yellow quantum dot material.

6. The quantum dot color filter claimed as claim 1, further comprising a black matrix, which is configured to separate color sub-pixels of different colors.

7. The quantum dot color filter claimed as claim 6, further comprising a protection layer, and the protection layer covers the pixels and the black matrix and is of a transparent material.

8. The quantum dot color filter claimed as claim 1, wherein the quantum dot material is at least one of zinc sulfide, zinc oxide, gallium nitride, zinc selenide, cadmium sulfide, gallium selenide, cadmium selenide, zinc telluride, cadmium telluride, gallium arsenide, indium phosphide or lead telluride.

9. A display apparatus, comprising the quantum dot color filter claimed as claim 1 and a backlight source,
wherein a wavelength of light emitted by the backlight source is smaller than a wavelength of light generated by the quantum dot material in the color filter after the quantum dot material is excited.

10. The display apparatus claimed as claim 9, wherein the backlight source is an ultraviolet backlight source; the red sub-pixel in the color filter is formed of a red quantum dot material, the green sub-pixel is formed of a green quantum dot material, the blue sub-pixel is formed of a blue quantum dot material, and each of the color sub-pixel regions has an optical filtering layer provided therein for absorbing ultraviolet light.

11. The display apparatus claimed as claim 9, wherein the backlight source is a blue backlight source; the red sub-pixel in the quantum dot color filter is formed of a red quantum dot material, the green sub-pixel is formed of a green quantum dot material, the blue sub-pixel is formed of a transparent material, the optical filtering layer is not provided in the region of the blue sub-pixel but in the region of every other color sub-pixel for absorbing blue light.

12. The display apparatus claimed as claim 11, wherein the backlight source is a blue light emitting diode, a wavelength range of emitted light is from 440 to 455 nm; and the optical filtering layer acts to absorb light in the range of 440 to 455 nm.

13. A manufacturing method of a quantum dot color filter, the color filter comprising a plurality of pixels, each of which consists of a blue sub-pixel and a plurality of color sub-pixels of different colors other than blue, the method comprising:

forming a pattern of an optical filtering layer;

forming a pattern of the color sub-pixels, wherein the color sub-pixels are formed in color sub-pixel regions for different colors with quantum dot materials of corresponding colors, wherein, the blue sub-pixel is directly disposed on the base substrate, and the optical filtering layer is disposed between the base substrate and the color sub-pixels other than the blue sub-pixel.

14. The manufacturing method claimed as claim 13, further comprising:

forming a black matrix;

and/or forming a protection layer.

15. The manufacturing method claimed as claim 14, further comprising:

forming a pattern of an optical filtering layer, wherein no optical filtering layer is provided in a blue sub-pixel region of the color filter;

forming a black matrix, with which different color sub-pixel regions are separated;

forming a red sub-pixel in a red sub-pixel region of the color filter with a red quantum dot material, forming a green sub-pixel in a green sub-pixel region of the color filter with a green quantum dot material, and forming a blue sub-pixel in a blue sub-pixel region of the color filter with a blue quantum dot material.

16. The manufacturing method claimed as claim 15, wherein a transparent material for the blue sub-pixel region is formed at the same time as the protection layer.

17. The manufacturing method claimed as claim 15, wherein the pixel further comprises a yellow sub-pixel, which is formed with a yellow quantum dot material.

18. The manufacturing method claimed as claim 14, comprising:

forming a pattern of an optical filtering layer, wherein the optical filtering layer is provided in each of the color sub-pixel regions;

forming a black matrix, with which different color sub-pixel regions are separated;

forming a red sub-pixel in a red sub-pixel region of the color filter with a red quantum dot material, forming a green sub-pixel in a green sub-pixel region of the color filter with a green quantum dot material, and forming a blue sub-pixel in a blue sub-pixel region of the color filter with a transparent material.

19. The manufacturing method claimed as claim 16, wherein the pixel further comprises a yellow sub-pixel, which is formed with a yellow quantum dot material.

* * * * *